(12) United States Patent
Ksiezopolski et al.

(10) Patent No.: US 7,614,677 B2
(45) Date of Patent: *Nov. 10, 2009

(54) SEAL ASSEMBLY FOR MOBILE LIVING QUARTERS

(75) Inventors: Edwin E. Ksiezopolski, Granger, IN (US); Norman L. Newhouse, Mishawaka, IN (US)

(73) Assignee: Lifetime Industries, Inc., Elkhart, IN (US)

( * ) Notice: Subject to any disclaimer, the term of this patent is extended or adjusted under 35 U.S.C. 154(b) by 282 days.

This patent is subject to a terminal disclaimer.

(21) Appl. No.: 11/621,457

(22) Filed: Jan. 9, 2007

(65) Prior Publication Data

US 2008/0048464 A1 Feb. 28, 2008

Related U.S. Application Data

(63) Continuation-in-part of application No. 11/466,235, filed on Aug. 22, 2006.

(51) Int. Cl.
*B60P 3/34* (2006.01)
(52) U.S. Cl. .................... 296/26.09; 296/171; 296/175; 296/26.13
(58) Field of Classification Search ................. 296/165, 296/171, 175, 26.09, 26.13; 52/67; 277/644, 277/645
See application file for complete search history.

(56) References Cited

U.S. PATENT DOCUMENTS

| | | | |
|---|---|---|---|
| 3,719,386 A | 3/1973 | Puckett et al. | |
| 4,361,348 A | 11/1982 | Rapp et al. | |
| 5,237,782 A | 8/1993 | Cooper | |
| 5,785,373 A * | 7/1998 | Futrell et al. | 296/26.01 |
| 5,788,306 A | 8/1998 | DiBiagio et al. | |
| 5,791,715 A | 8/1998 | Nebel | |
| 5,894,698 A | 4/1999 | Dewald, Jr. et al. | |
| 6,048,016 A | 4/2000 | Futrell et al. | |
| 6,094,870 A | 8/2000 | Stacy | |
| 6,152,516 A | 11/2000 | Williams | |
| 6,176,045 B1 * | 1/2001 | McManus et al. | 52/67 |
| 6,224,126 B1 | 5/2001 | Martin et al. | |
| 6,401,398 B1 | 6/2002 | Panayides et al. | |
| 6,428,073 B1 | 8/2002 | Blodgett, Jr. | |
| 6,527,324 B2 | 3/2003 | McManus et al. | |
| 6,572,170 B2 | 6/2003 | McManus | |
| 6,598,354 B2 * | 7/2003 | McManus et al. | 52/67 |
| 6,619,726 B2 * | 9/2003 | Jones | 296/163 |
| 6,966,590 B1 | 11/2005 | Ksiezopolski et al. | |

(Continued)

FOREIGN PATENT DOCUMENTS

WO  WO 99/33683  7/1999

(Continued)

*Primary Examiner*—Jason S Morrow
(74) *Attorney, Agent, or Firm*—Botkin & Hall, LLP (57) ABSTRACT

A seal assembly for mobile living quarters seals around a slide-out room, includes a pair of attaching members extending along the inside and outside surfaces of the main living area wall at an aperture through which the slide-out room moves, and further includes a connecting member extending between the attaching members and along the edge of the wall defining the aperture. A wiper seal extends from the connecting member to flex against the walls of the slide-out room, and the connecting member further includes an accordion pleat for adjusting the distance between the attaching members to thereby accommodate walls of different thicknesses.

4 Claims, 11 Drawing Sheets

U.S. PATENT DOCUMENTS

| | | | |
|---|---|---|---|
| 7,380,854 B1 * | 6/2008 | Hanser et al. | 296/26.13 |
| 2002/0078634 A1 | 6/2002 | McManus et al. | |
| 2006/0091687 A1 * | 5/2006 | Schoffner et al. | 296/26.01 |
| 2008/0116707 A1 * | 5/2008 | Boaz et al. | 296/26.01 |
| 2008/0265618 A1 * | 10/2008 | Cadena et al. | 296/175 |

FOREIGN PATENT DOCUMENTS

| | | |
|---|---|---|
| WO | WO 02/30705 | 4/2002 |

* cited by examiner

SEAL ASSEMBLY FOR MOBILE LIVING QUARTERS

This application is a continuation-in-part of U.S. patent application Ser. No. 11/466,235, filed Aug. 22, 2006, the subject matter of which is disclosed in this application and hereby incorporated by reference.

BACKGROUND OF THE INVENTION

1. Field of the Invention

This invention relates to a seal for sealing between a slide-out room and the main living quarters of mobile living quarters, such as a recreational vehicle.

2. Description of the Background of the Invention

Mobile living quarters, such as motor homes, travel trailers, and similar types of recreational vehicles, are commonly equipped with one or more slide-out rooms that are retracted within the main living quarters when the unit is transported, but which can be extended from the main living quarters to provide auxiliary space when the unit is parked for use. Commonly, a bulb seal extends around the aperture defined in the outside of the sidewall of the main living quarters through which the slide-out room extends and retracts. This seal is engaged by a first flange on the slide-out room to seal the gap between the slide-out room and the main living quarters when the slide-out room is retracted. Similarly, a second bulb seal extends around the aperture on the inside of the sidewall and is engaged by a second flange (offset axially from the first flange) when the slide-out room is extended for use. A wiper seal mounted on the sidewall extends into the aperture and is flexed against the corresponding walls of the slide-out room. The bulb seals seal the slide-out room in the extended and retracted positions, and the wiper seal wipes against the slide-out room as it is extended and retracted to prevent moisture and debris to enter the living quarters. A similar prior art seal is disclosed in U.S. Pat. No. 6,966,590.

Ideally, two or more of the aforementioned seals are combined into a single member for ease of installation. Commonly, the seals are manufactured continuously, so that an appropriate length may be cut off and installed when the mobile living quarters is manufactured; the bulb seals are commonly manufactured separately from underlying attachment members that are initially installed on the mobile living quarters, with the bulb seals themselves snapped onto the attachment members or slid along the attachment members after the latter are installed.

Obviously, to ease manufacture, it is desirable that the attachment members for the inside and outside and the wiper seals are made in one piece, to thereby facilitate installation. One problem with prior art seals in which the inside and outside attachment members were part of a common sealing unit is that the unit had to include a connecting portion which extended across the aperture. Since different manufacturers, and different models made by the same manufacturer, may have walls of different thicknesses, either different sealing assemblies or separate seals must be used. Clearly, it is desirable to have a common sealing assembly that can be used on all mobile living quarter designs, even though they may have different wall thicknesses.

SUMMARY OF THE INVENTION

According to an embodiment of the invention, a seal for mobile living quarters is provided for sealing around a slide-out room of mobile living quarters having an aperture slidably receiving a slide-out room. The seal has a pair of attaching members extending along the inside and outside surfaces of the main living area wall at the aperture and further include a connecting member extending between the attaching members and along the edge of the wall defining the aperture. A wiper seal extends from the connecting member, which flexes against the walls of the slide-out room, and the connecting member further includes an accordion pleat for adjusting the distance between the attaching members to thereby accommodate walls of different thicknesses.

DETAILED DESCRIPTION OF INVENTION

Figure 1:
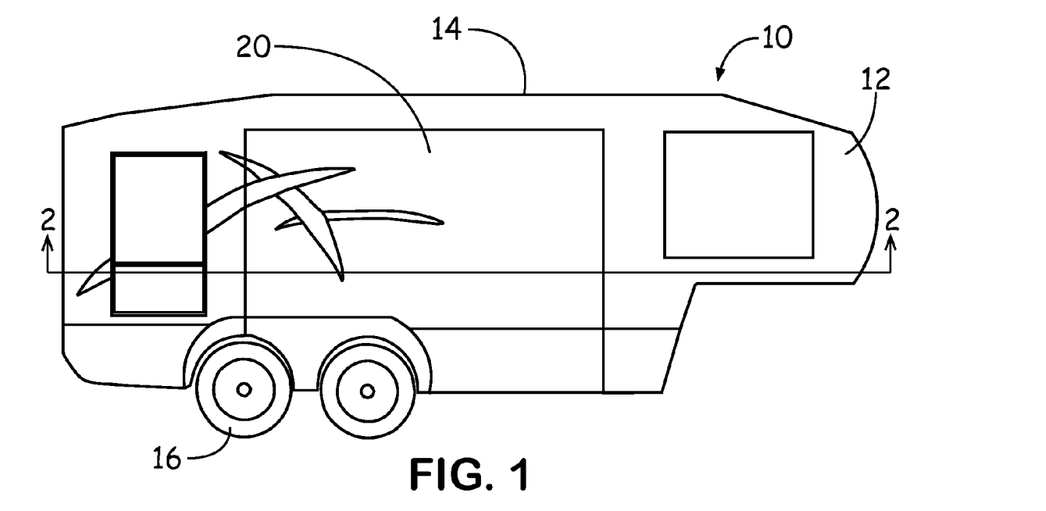
FIG. 1 is a side view of a mobile living quarters incorporating a seal made pursuant to the teachings of the present invention.
Figure 2:
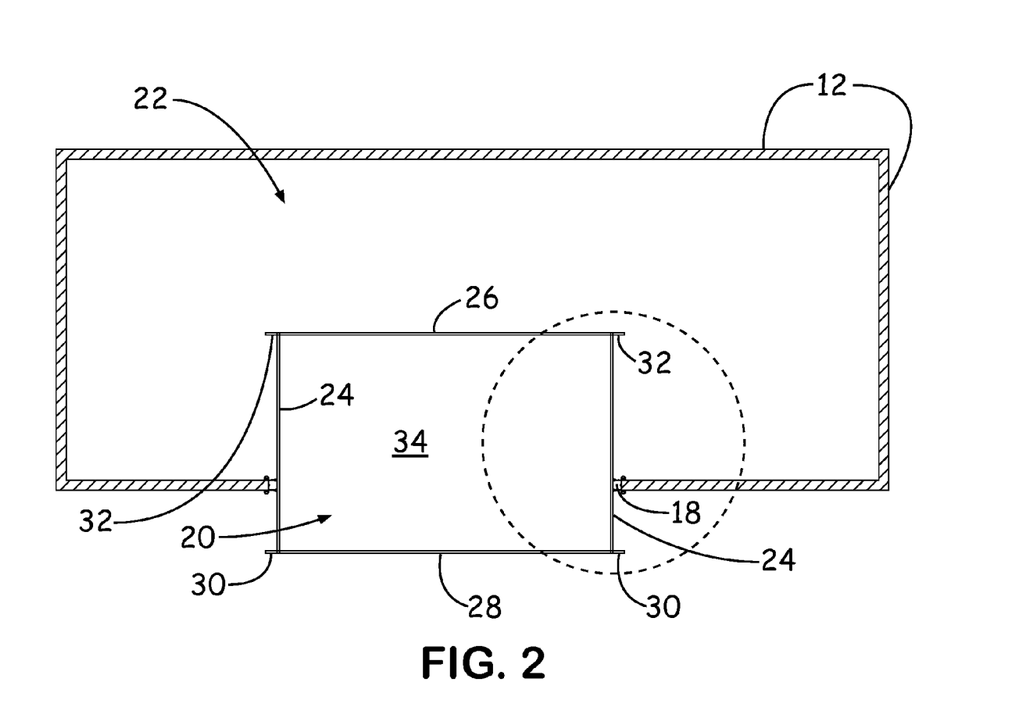
FIG. 2 is a cross-sectional view taken substantially along lines 2-2 of FIG. 1 and illustrating the seal of the invention.
Figure 3:
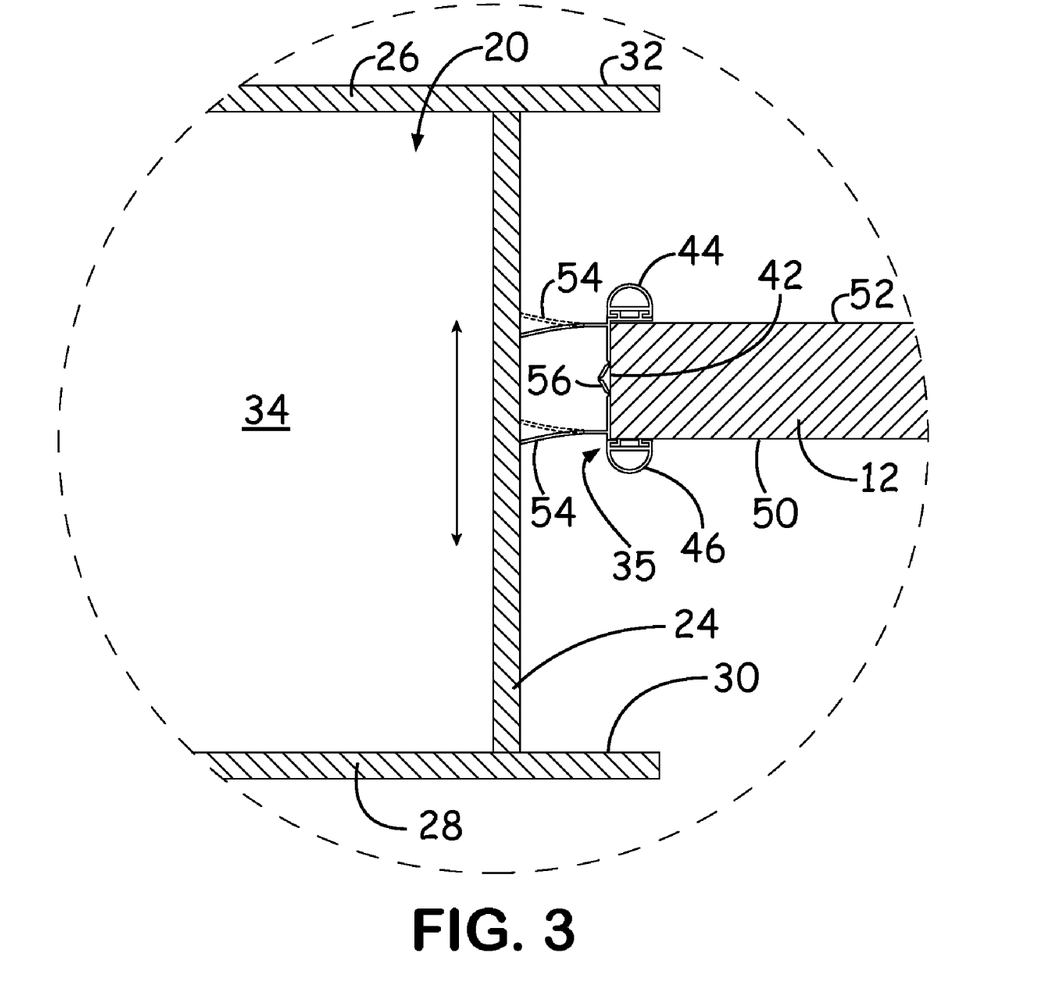
FIG. 3 is a cross-sectional view taken substantially along lines 4-4 of FIG. 1, but on a reduced scale.
Figure 4:
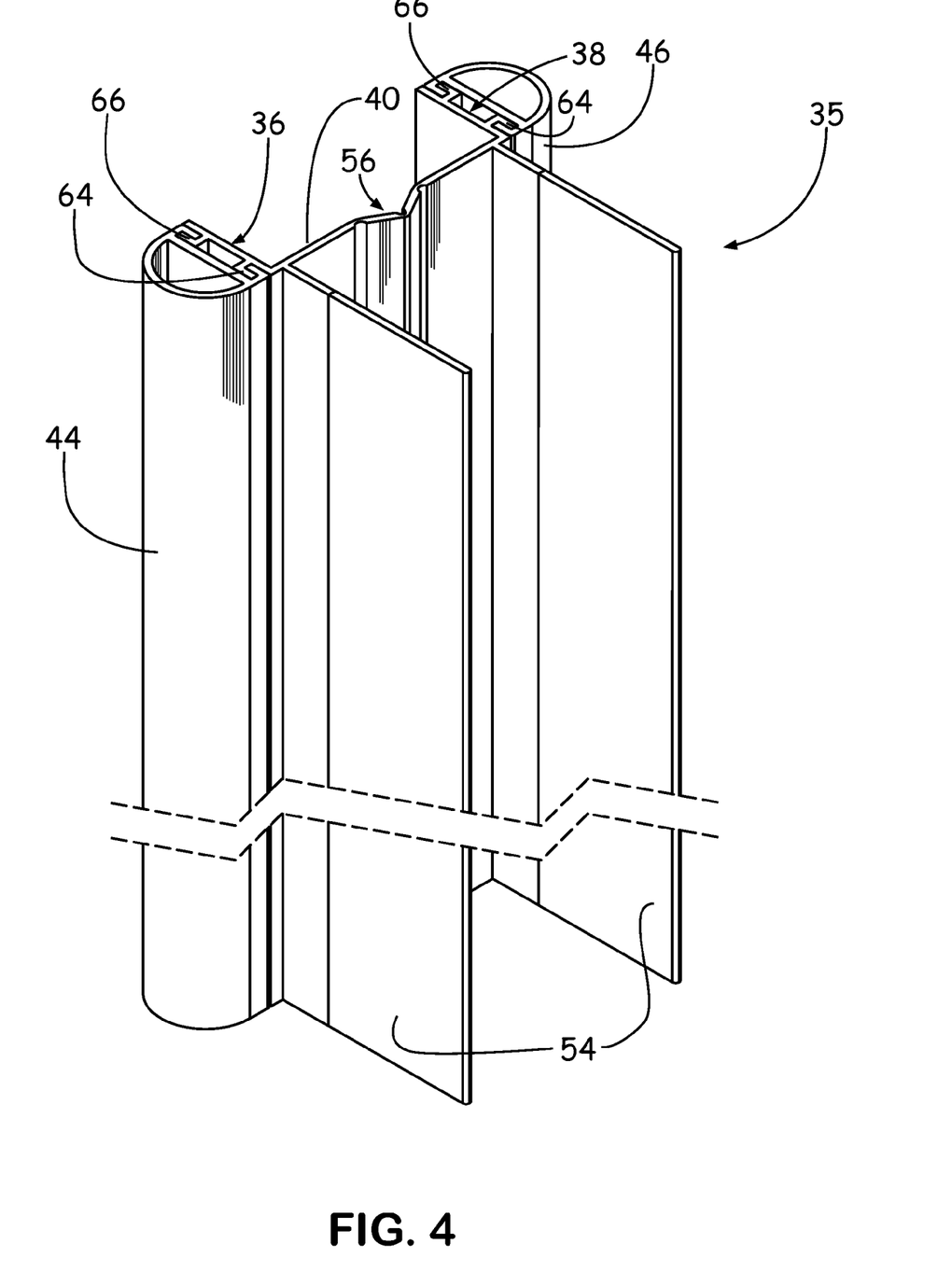
FIG. 4 is an enlarged view in perspective of the seal illustrated in FIG. 2.
Figure 5:
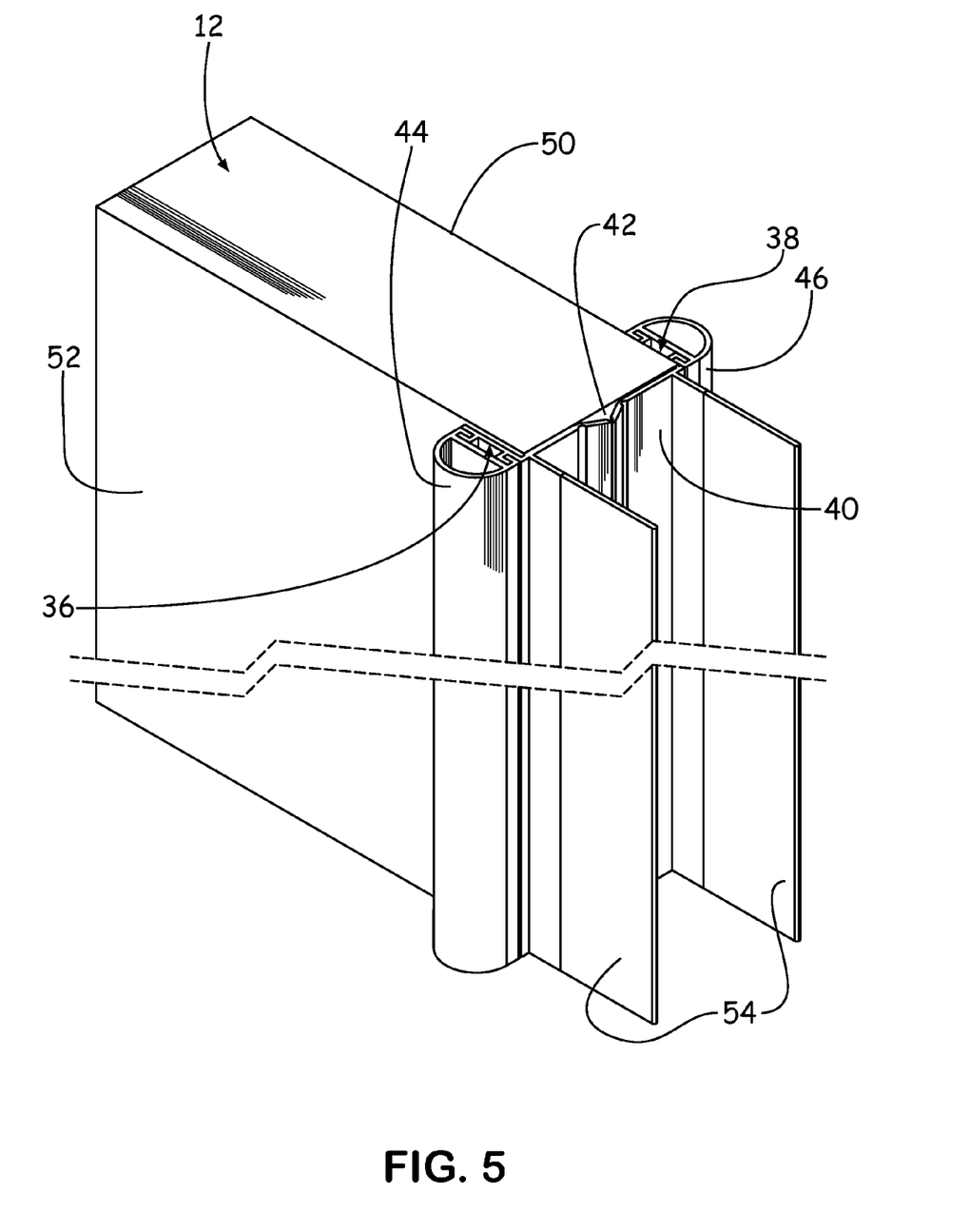
FIG. 5 is a view similar to FIG. 3, but illustrating the seal installed on a wall of mobile living quarters.

Referring now to the drawings, mobile living quarters, such as the fifth wheel recreational vehicle generally indicated at 10, include side walls 12 and a ceiling wall 14. The mobile living quarters 10 is mounted on wheels 16 for transport. An aperture 18 is provided in one of the side walls 12 and slidably receives a slide-out room 20. The side walls 12 and ceiling wall 14 cooperate to define a main living area generally indicated by the numeral 22. The slide-out room includes side walls 24, a ceiling wall 26, and a front wall 28. As known to those skilled in the art, the slide-out room 20 is mounted for movement through the aperture 18, so that it may be retracted into the main living quarters 22 when the unit is transported, but can be extended from the main living quarters when the unit is parked for use, thereby providing auxiliary living space. The slide-out room 20 includes a flange 30 extending around the side walls 24 and ceiling wall 26 at the front wall 28 and another flange 32 extending around the side walls 24 and ceiling wall 26 at the ends thereof opposite the ends joined to the front wall 28. The side walls 24, ceiling wall 26 and front wall 28 cooperate to define an auxiliary living area 34, which is available for use when the unit is parked and the slide-out room 20 is moved to the extended position.

It is necessary to assure that moisture, dirt, debris, etc., be prevented from entering the living quarters. Accordingly, bulb seals 44, 46 are mounted around the aperture 18 on an outside surface 50 and an interior surface 52 of the side wall 12 adjacent the aperture 18, and a wiper seal engages the side walls 24 and ceiling wall 26 of the slide-out room 20 to wipe against the walls 24, 26 as the slide-out room 20 extends and retracts. Preferably, a seal assembly 35 is made continuously, so that an appropriate length can be cut off and installed. The seal assembly generally indicated by the numeral 35 includes a pair of longitudinal attachment members 36, 38, which are connected by a longitudinal connecting member 40, which extends over the transverse edge 42 of the sidewall 12. Bulb seals 44, 46 are manufactured separately and attached to their corresponding attachment members 36 and 38, as will be hereinafter described. To facilitate installation of the seal assembly 35 on the unit 10, a strip of double-sided adhesive tape 48, one side of which is adhesively connected to the side of attachment member 38 which lies against the outside surface 50 of the side wall 12, and is sufficient to loosely position attachment member 36 against the inside surface 52 of the side wall 12 and the connecting member 40 over the transverse edge 42. The outside of the tape 48 is covered with a paper backing, which is stripped away to expose the adhesive just before the attachment member 38 is applied against the outside surface 50 to thereby hold the seal assembly 35 in place. The seal assembly 35 is later firmly attached to the corresponding inside and outside surfaces 52 and 50 by appropriate fasteners, such as screws or nails, before the bulb seals 44, 46 are installed on the attachment members 36, 38, such that the fasteners are driven through the corresponding attachment members 36, 38, and into the side wall 12. Alternatively, the seal assembly 35 is firmly attached to the corresponding inside and outside surfaces 52 and 50 by appropriate fasteners, such as screws or nails, after the bulb seals 44, 46 are installed on the attachment members 36, 38, such that the fasteners are driven through the bulb seals 44, 46, through the corresponding attachment members 36, 38, and into the side wall 12. Wiper seals 54 extend from the connecting portion 40 and are adapted to flex against the side walls 24 and ceiling wall 26 of the slide-out room 20 during extension and retraction of the latter.

Figure 6:
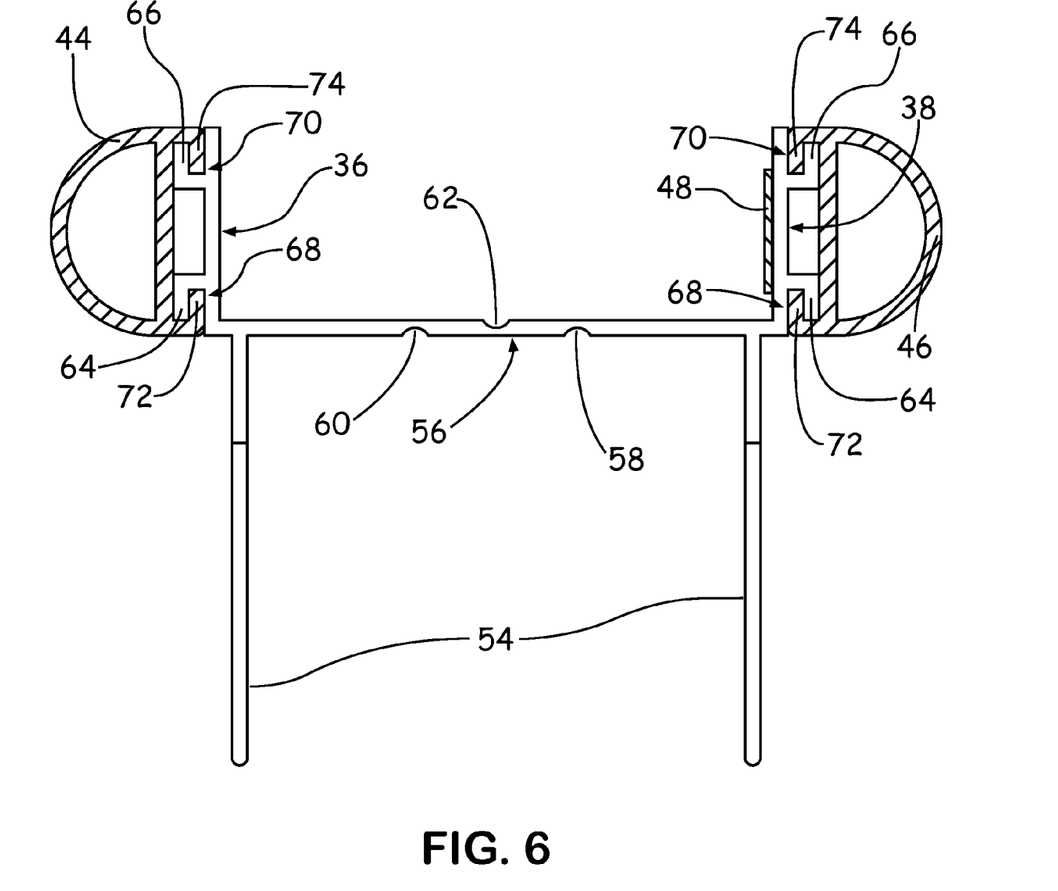
FIG. 6 is an enlarged, transverse cross-sectional view of the seal illustrated in FIGS. 2-4, the seal being shown in an "open" position to accommodate installation on a wall that is relatively thick.
Figure 7:
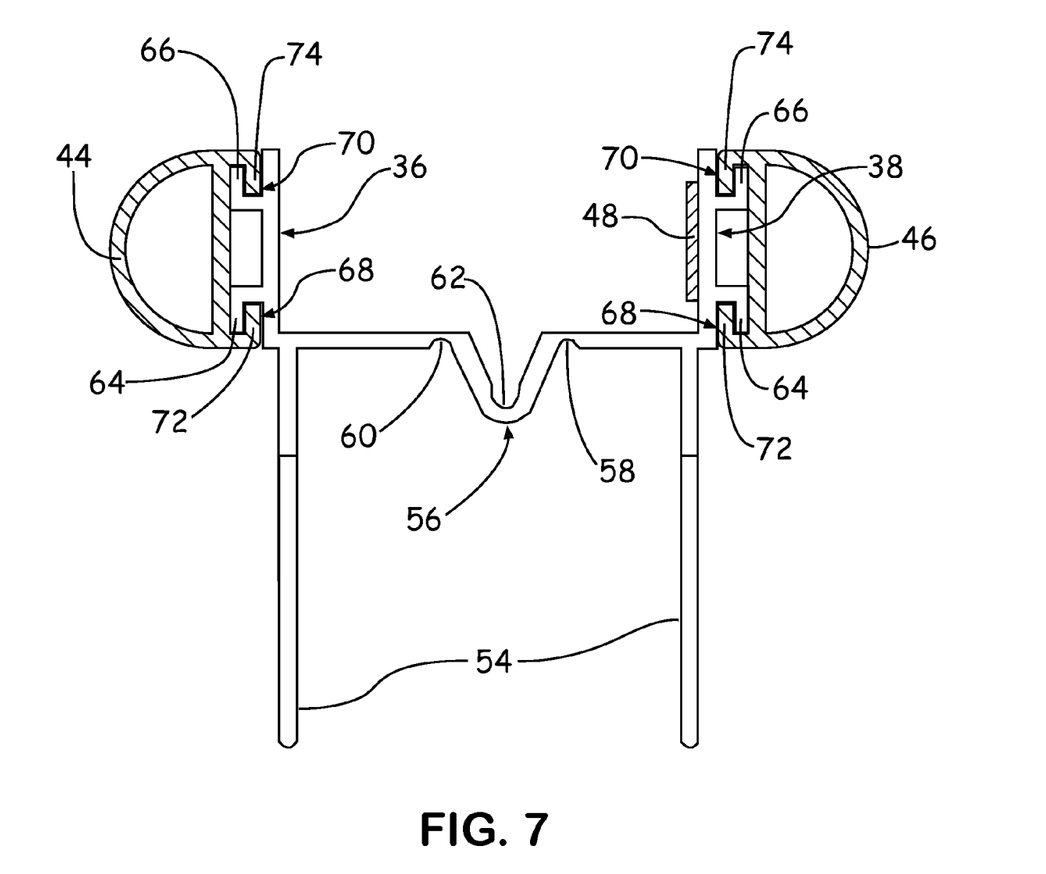
FIG. 7 is a view similar to FIG. 5, but illustrating the seal in a "closed" position to accommodate installation on a wall that is substantially less thick.

Different manufacturers of mobile living quarters manufacture the sidewalls thereof from different materials and thus the sidewalls of different manufacturers are of different thicknesses. However, it is clearly desirable that the number of different variations of the seal assembly 35 that must be manufactured be minimized. Accordingly, an accordion pleat 56 extends along the length of the connecting member 40 to permit the width of the connecting member 40 to be adjusted, to thereby accommodate walls of varying thicknesses, as illustrated in FIGS. 6 and 7. In FIG. 7, the seal assembly 35 is in a "closed" or narrow position, to accommodate a relatively narrow sidewall. In this position, the accordion pleat 56 projects into the space between the wiper seals 54. In FIG. 6, the seal assembly is in an "open" position, which accommodates the widest sidewall. In this position, the accordion pleat is stretch out so that the connecting member lies substantially flat against the transverse edge 42. It will be noted that as the attachment members 36, 38 are secured to their corresponding inside and outside surfaces 50, 52, the width of the connecting member 40 automatically adjusts to accommodate a sidewall of any thickness between those accommodated by the fully open and fully closed positions of FIGS. 6 and 7. The pleat 56 is formed by scoring parallel, longitudinal score lines 58, 60 on the side of the connecting member 40 facing away from the transverse edge 42 and between the wiper seals 54, and by forming a third longitudinal score line 62 on the side of the connecting member 40 that lies against the transverse edge 42 when the seal assembly is installed on the sidewall. The third score line 62 extends parallel to the score lines 58, 60, and is located midway between them. The first, second and third score lines define corresponding first, second and third fold lines, thereby forming the accordion pleat.

Each of the attachment members 36, 38 are provided with a pair of longitudinal, parallel rails 64, 66, which cooperate with the body of the corresponding attachment member 36 or 38 to define a corresponding pair of grooves 68, 70. Each of the bulb seals 44, 46 are formed with a pair of longitudinal, parallel, inwardly projecting tabs 72, 74 that project toward one another and are received within a corresponding one of the grooves 68 or 70 when the bulb seals 44, 46 are installed on the attachment members 36 and 38. The bulb seals are sufficiently flexible that they may be flexed during installation on the attachment member 36 or 38 to cause the tabs 72, 74 to be received within their corresponding grooves 68 or 70. Alternatively, the bulb seals 44, 46 may be installed upon the attachment members by sliding the bulb seals 44, 46 over the ends of the rails 64, 66 and then sliding the bulb seals along the rails. Before the bulb seals 44, 46 are properly positioned on their corresponding attachment member 36, 38, fasteners (not shown), such as screws or nails, may be driven through the attachment members 36, 38 and then into the side wall 12. Alternatively, after the bulb seals 44, 46 are properly positioned on their corresponding attachment member 36, 38, fasteners (not shown), such as screws or nails, may be driven through the bulb seals 44, 46, through the corresponding attachment members 36, 38 and then into the side wall 12. It will be remembered that prior to installation of the fasteners, the seal assembly 35 is temporarily loosely secured by the tape 48.

Figure 8:
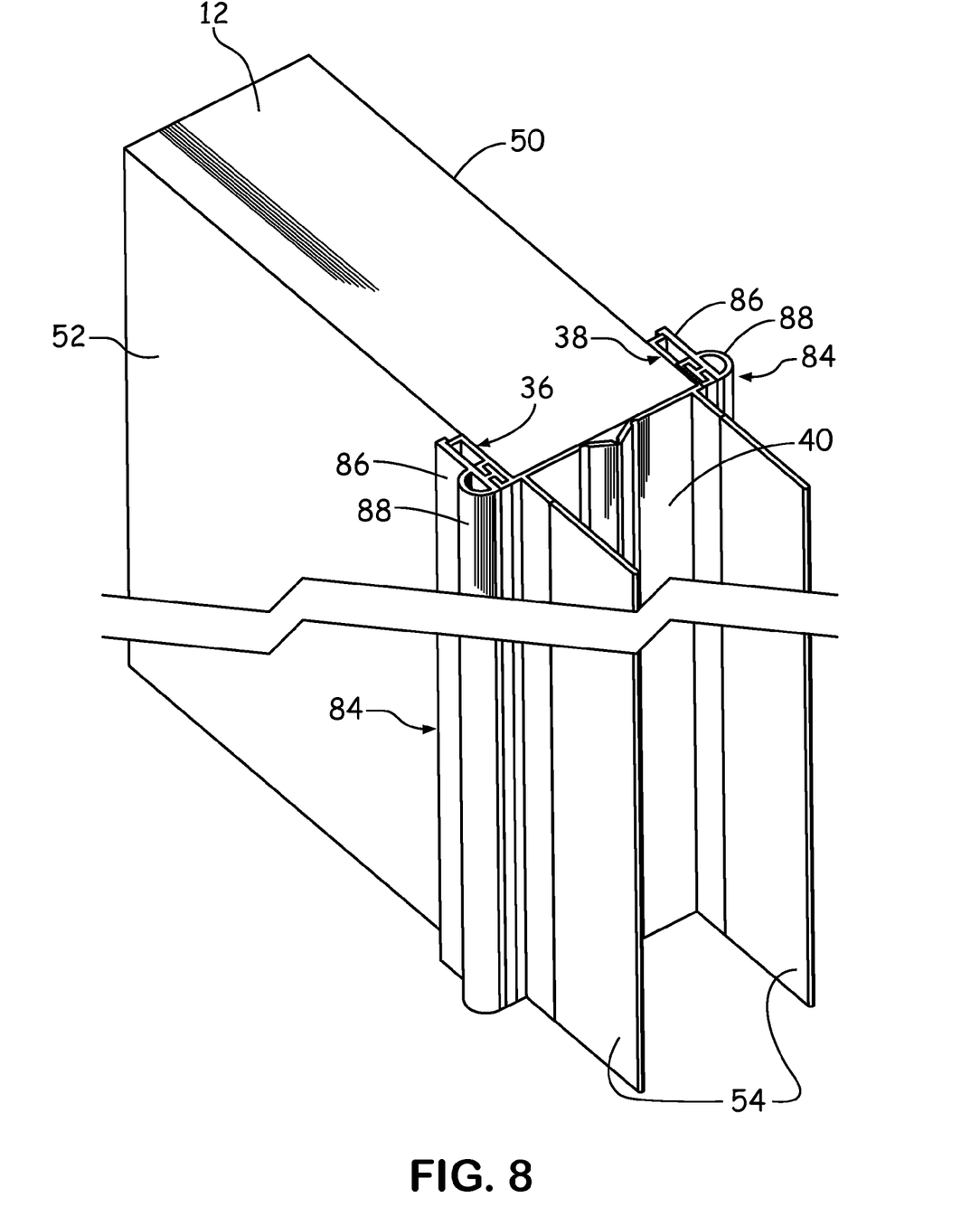
FIG. 8 is a view similar to FIG. 5, but illustrating an alternate embodiment of the invention.
Figure 9:
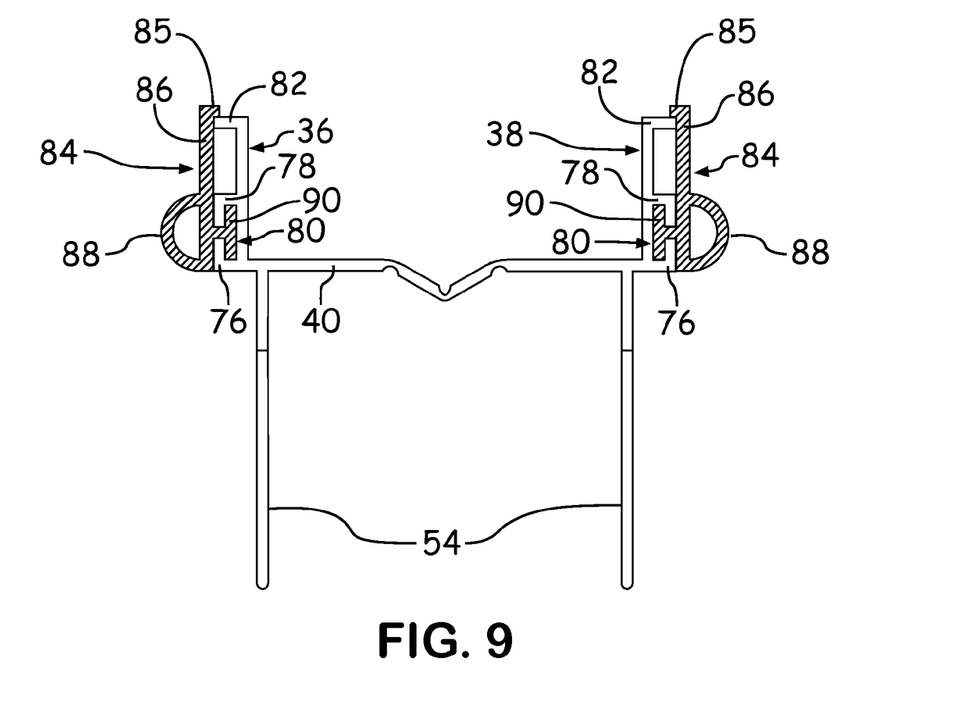
FIG. 9 is an enlarged, transverse cross-sectional view of the seal illustrated in FIG. 8.

Referring now to the embodiment of FIGS. 8 and 9, each of the attachment members 36, 38 is provided with a pair of rails 76, 78 which define facing grooves cooperating to define a generally T-shaped slot 80. The attachment members 36, 38 also are provided with a third rail 82 offset from the rails 76, 78. A bulb sealing member 84 includes a base 86 which extends over all three of the rails 76, 78 and 82 and terminates in a lip 85 that fits over the third rail 82. A sealing bulb 88 is carried by the base 86 at a point over the rails 76 and 78, and a T-shaped tab 90 extends from the base 86 and into the slot 80. Accordingly, the bulb sealing member 84 cannot easily be dislodged from the attachment member 36 or 38, and the rails 76, 78 and 82 cannot easily be bent by forces applied to the bulb sealing member 84.

Figure 10:
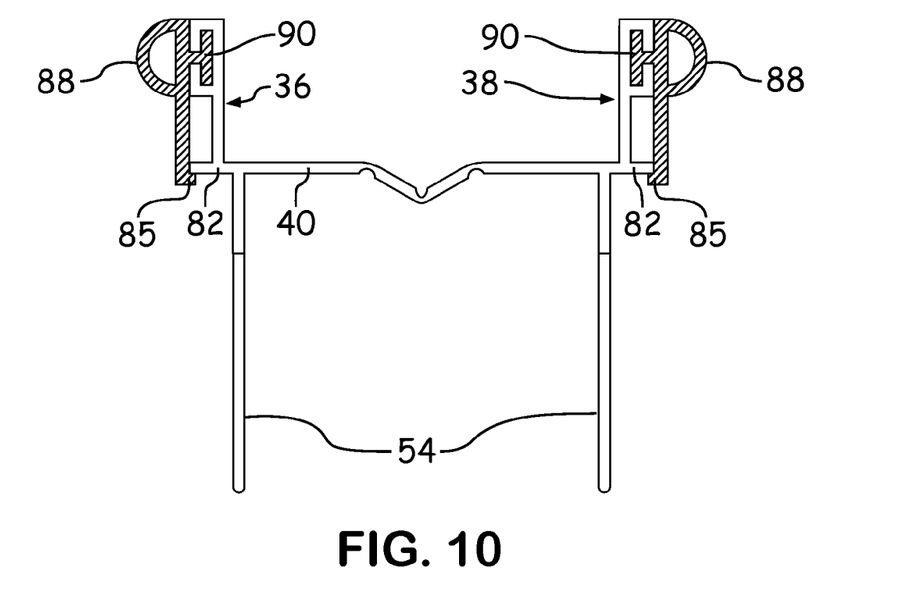
FIGS. 10-16 are views similar to FIG. 9, but illustrating modifications of the embodiment illustrated in FIG. 9.

Referring to FIG. 10, depending upon the application, it may be necessary or desirable to locate the sealing bulb 88 and the rails 76, 78 offset from the connecting member 40, instead of immediately adjacent thereto as is shown in FIG. 9.

Figure 11:
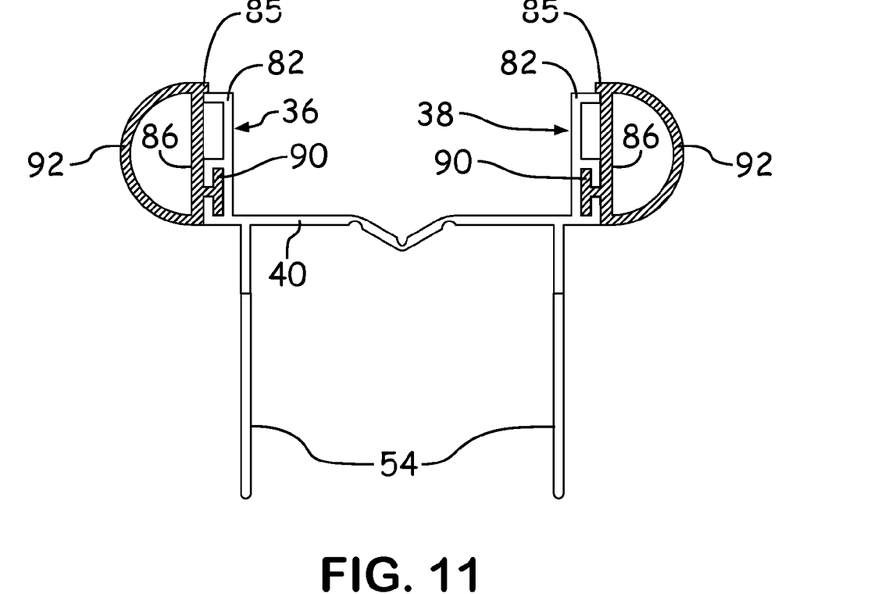
Figure 12:
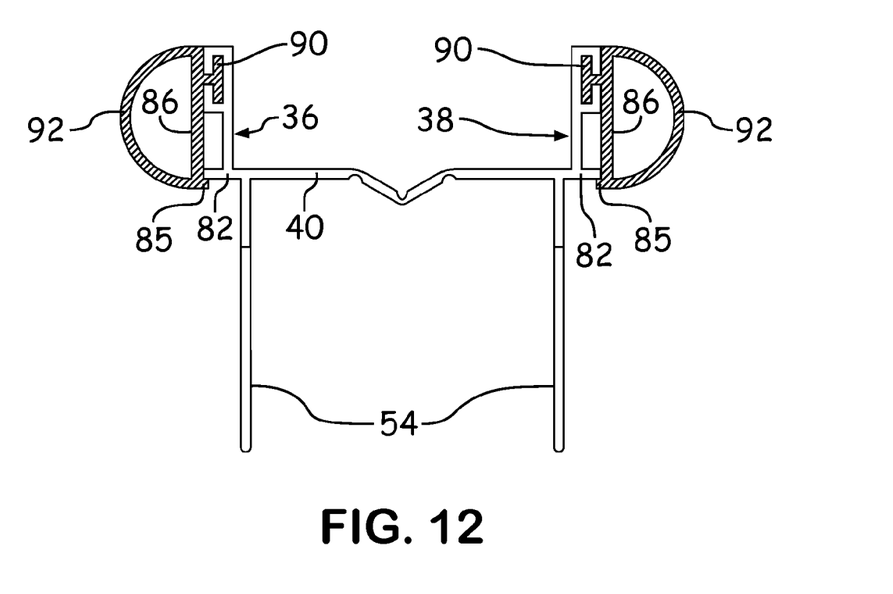
Figure 13:
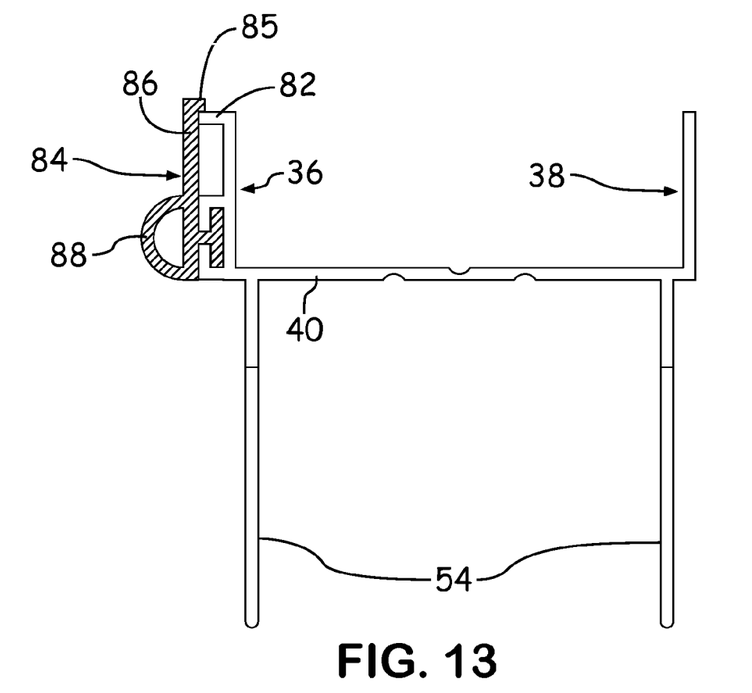
Figure 14:
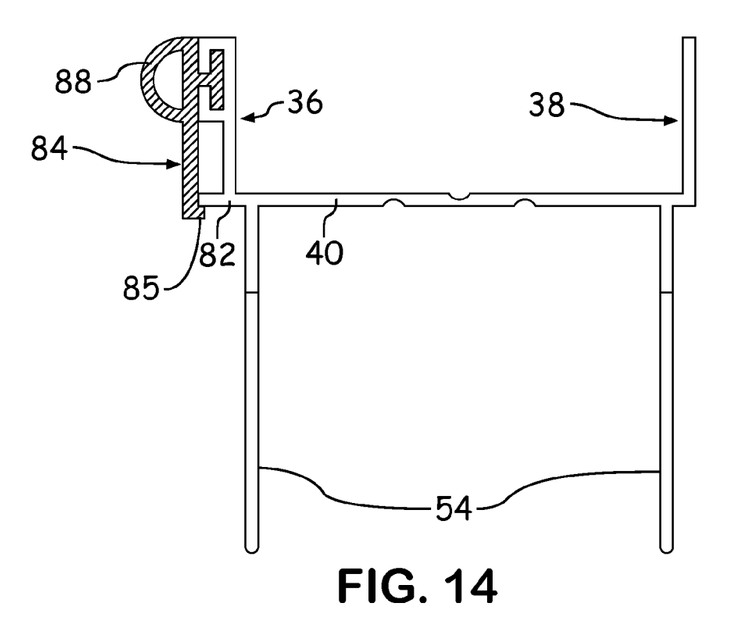
Figure 15:
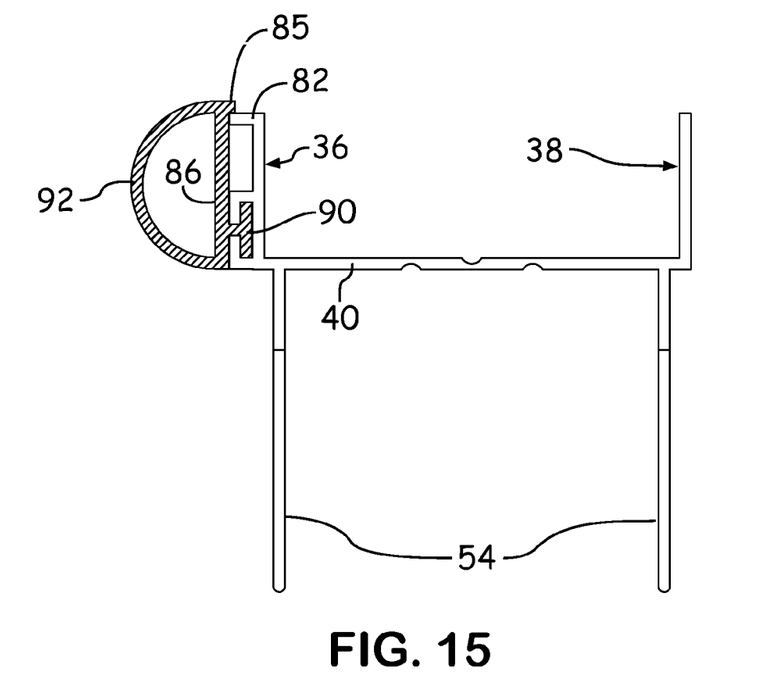
Figure 16:
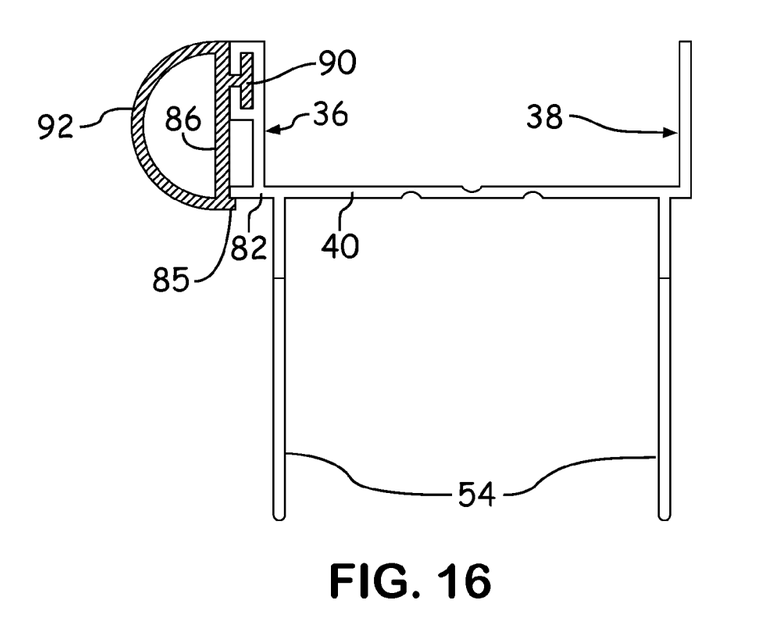

Referring to FIGS. 11 and 12, a large diameter sealing bulb 92 that extends over the entire base 86 may be used, with the attachment to the rails 76, 78 and 82 either immediately adjacent the connecting member 40 (FIG. 11) or displaced therefrom (FIG. 12). Referring to FIGS. 13-16, the bulb sealing member may be located on only one of the attachment member 36 or 38, so that the slide-out room will only be sealed in the fully extended or fully retracted position, depending upon customer preference.

What is claimed is:

1. A seal assembly for mobile living quarters having:
main living area walls defining a main living area; and
an aperture in one of said main living area walls slidably receiving a room having room walls defining auxiliary living space; said one main living area wall having an outside surface, an inside surface, and a transverse surface extending between the inside and outside surfaces, said transverse surface defining said aperture; said seal assembly having a pair of attaching members extending along said one main living area wall at said aperture, said attaching members secured to said inside and outside surfaces, at least one of said attaching members carries a pair of parallel rails, each of said parallel rails cooperating with one said attaching member to define facing grooves cooperating to define a generally T-shaped slot, said bulb sealing member having a T-shaped tab received within said slot to secure said bulb sealing member to the attaching member, and a connecting member extending between said attaching members and along said transverse surface, said connecting member including an adjuster for adjusting the distance between the attaching members, said slide-out room being movable between fully extended and fully retracted positions and carries at least one flange projecting outwardly from said slide-out room walls, a bulb sealing member mounted on at least one of said attaching members and being engaged by said flange when said slide-out room is in the fully extended or fully retracted position.

2. Seal assembly as claimed in claim 1, wherein one of said attaching members includes a third rail extending parallel to said pair of parallel rails, said bulb sealing member including a lip engaging said third rail.

3. Seal assembly for mobile living quarters having:
main living area walls defining a main living area; and
an aperture in one of said main living area walls slidably receiving a room having room walls defining auxiliary living space; said one main living area wall having an outside surface, an inside surface, and a transverse surface extending between the inside and outside surfaces, said transverse surface defining said aperture; said seal assembly having a pair of attaching members extending along said one main living area wall at said aperture, said attaching members secured to said inside and outside surfaces, and a connecting member extending between said attaching members and along said transverse surface, said connecting member including an adjuster for adjusting the distance between the attaching members, said connecting member extending across the transverse surface to permit attaching members to be mounted on their inside and outside surfaces, wherein said adjuster permits the connecting member to be adjusted to accommodate said main living area walls of different thicknesses, said adjuster being an accordion pleat in said connecting member.

4. Seal assembly as claimed in claim 3, wherein said accordion pleat is defined between first and second parallel score lines defining a pair of corresponding fold lines, and a third score line defining a third fold line between and extending parallel to said first and second score lines.

* * * * *